(12) United States Patent
Duarte et al.

(10) Patent No.: US 7,585,350 B2
(45) Date of Patent: Sep. 8, 2009

(54) PRODUCTION OF FERRONICKEL

(75) Inventors: Alexey Duarte, Singapore (SG); Houyuan Liu, Shortland (AU); Ivan Petkov Ratchev, Jesmond (AU)

(73) Assignee: BHP Billiton SSM Technology Pty Ltd.

( * ) Notice: Subject to any disclaimer, the term of this patent is extended or adjusted under 35 U.S.C. 154(b) by 0 days.

(21) Appl. No.: 11/839,876

(22) Filed: Aug. 16, 2007

(65) Prior Publication Data

US 2008/0011126 A1 Jan. 17, 2008

Related U.S. Application Data

(63) Continuation of application No. PCT/AU2006/000225, filed on Aug. 31, 2006.

(30) Foreign Application Priority Data

Feb. 24, 2005 (AU) .............................. 2005900852

(51) Int. Cl.
*C22C 1/00* (2006.01)
*C22C 38/00* (2006.01)
*C22B 5/12* (2006.01)

(52) U.S. Cl. .................. 75/430; 75/439; 75/770

(58) Field of Classification Search ............... 75/770, 75/430, 479; 420/458
See application file for complete search history.

(56) References Cited

U.S. PATENT DOCUMENTS

| 3,996,045 | A | 12/1976 | Ishii |
| 4,490,174 | A | 12/1984 | Crama et al. |
| 4,975,116 | A | 12/1990 | Båsen et al. |
| 7,226,493 | B2 * | 6/2007 | Grong et al. .................. 75/255 |

FOREIGN PATENT DOCUMENTS

| AU | 65078/90 | | 5/1991 |
| GB | 2291870 | A * | 2/1996 |
| JP | 60234904 | A * | 11/1985 |
| JP | 62-023944 | | 1/1987 |
| JP | 05-125465 | | 5/1993 |
| JP | 05125465 | A * | 5/1993 |

* cited by examiner

*Primary Examiner*—George Wyszomierski
*Assistant Examiner*—Tima M McGuthry-Banks
(74) *Attorney, Agent, or Firm*—Brinks Hofer Gilson & Lione; G. Peter Nichols

(57) ABSTRACT

A process for producing a ferronickel product from a mixed nickel iron hydroxide product, said process including the steps of: providing a mixed nickel iron hydroxide product; pelletising the mixed nickel iron hydroxide product to produce nickel iron hydroxide pellets; calcining the nickel iron hydroxide pellets to produce mixed nickel iron oxide pellets; and reducing the nickel iron oxide pellets with one or more reducing gases at high temperatures to produce ferronickel pellets.

29 Claims, 2 Drawing Sheets

PRODUCTION OF FERRONICKEL

This application is a continuation of and claims priority from PCT/AU2006/000225 published in English on Aug. 31, 2006 as WO 2006/089358 and from AU 2005900852 filed Feb. 24, 2005, the entire contents of each are incorporated herein by reference.

FIELD OF THE INVENTION

In general, the present invention relates to a new method for producing ferronickel from mixed nickel iron hydroxide by a combination of pelletisation, calcination and reduction. In particular, the present invention provides a new method which involves pelletisation of nickel iron hydroxide, calcination of the pellets to produce porous pellets of nickel iron oxide, and reduction to produce a novel ferronickel product. The ferronickel product may be further smelted to make a high quality ferronickel product. The method is particularly suited to nickel iron hydroxide precipitate that can be produced from an acidic product liquor derived from nickel containing ore bodies by a process such as pressure acid leaching, atmospheric agitation leaching and/or heap leaching of a laterite ore or oxidative leaching of nickel sulfide ores, followed by ion exchange to recover nickel.

BACKGROUND OF THE INVENTION

Laterite nickel and cobalt ore deposits generally contain oxidic type ores, limonites, and silicate type ores, saprolites, as two layers in the same deposits, separated by a transition zone. To minimise the equipment size for processing either the saprolites or the limonites by commercial processes, high grade limonite and saprolite are preferred. This leads to the lower grade ores and transition ores in some deposits being rejected as waste.

The higher nickel content saprolites tend to be treated by a pyrometallurgical process involving roasting and electrical smelting techniques to produce ferronickel. The power requirements and high iron to nickel ore ratio for the lower nickel content limonite, saprolite, and limonite/saprolite blends in the transition zone make this processing route too expensive for these ores.

The high nickel and cobalt content limonite is normally commercially treated hydrometallurgicaly by a high pressure acid leach process, or by a combination of pyrometallurgical and hydrometallurgical processes, such as the Caron reduction roast-ammonium carbonate leach process.

The above processes generally require "whole ore" processing as there is no effective method to beneficiate the ore. This has the disadvantage that the mineralogical fractions of the ore which may contain lower metal values effectively dilute the total treated ore quality and increase recovery costs.

The conventional treatment of saprolite to produce ferronickel, involves a drying step, followed by a reduction roast step to partially convert the nickel oxides to nickel, and smelting in an electrical furnace. This is a highly energy intensive process as the ratio of total ore to nickel is typically forty to one, and most of the power is expended in melting slag. It requires a high grade saprolite source to make it economic. It also has the disadvantage that financial value of any cobalt in the ore, which reports to the ferronickel, is not realised.

An improvement to this process would be to produce ferronickel directly from a nickel intermediate, eliminating the energy requirement to melt more than 95% of the ore.

It is a desired feature of the present invention to provide a simpler, less energy intensive, and lower capital investment process which overcomes or at least alleviates one or more of the difficulties associated with the prior art.

Nickel hydroxide is produced as an intermediate nickel compound commercially in the Cawse Plant in Australia. In the Cawse process, lateritic nickel ore is subjected to a high pressure sulfuric acid leach to extract the nickel and cobalt, along with other impurities. Waste ore and some impurities are separated from the leachate after partial neutralisation, and a mixed nickel cobalt hydroxide precipitated by further neutralisation with magnesium oxide.

Nickel hydroxide intermediate production by a similar process is also described in the prior art. For example, it may be produced as an intermediate from the leachate from high or atmospheric pressure acid laterite leaching or a combination of both, heap leaching of laterite or nickel sulfide ores or concentrates, or high pressure or atmospheric pressure leaching of sulfide ores or concentrates. The literature also teaches that nickel hydroxide may be produced from acidic nickel sulfate solutions produced as eluates, strip solutions, or raffinates from solvent extraction or ion exchange treatment of the prior mentioned process leachates or leach slurries.

International application PCT/AU2005/001360 in the name of BHP Billiton SSM Technology Pty Ltd discloses a process for the production of ferronickel or nickel matte by combined hydrometallurgical and pyrometallurgical processes. In the process disclosed in this specification, the nickel and iron are selectively absorbed on to a resin in an ion exchange process, eluted from the resin with sulfuric acid and the eluate is neutralised to precipitate a mixed nickel iron hydroxide product. The mixed nickel iron hydroxide product is then reduced directly to produce a ferronickel or nickel matte product.

The above discussion of documents, articles and the like is included in the specification solely for the purpose of providing a context for the present invention. It is not suggested or represented that any or all of these matters formed part of the prior art base or were common general knowledge in the field relevant to the present invention before the priority date.

SUMMARY OF THE INVENTION

In general, the present invention provides a process for producing a ferronickel product from a mixed nickel iron hydroxide product. The process is applicable to processing a wide range of nickel containing ores and is particularly applicable to processing laterite ores which are considered unexploitable with conventional processes. In one embodiment, the invention is applicable to a process where the laterite ore is subjected to a heap leach followed by an ion exchange process, where the nickel is firstly leached with sulfuric acid and then recovered as a product liquor solution containing nickel, cobalt and iron. In a preferred form of the invention, the mixed nickel iron hydroxide product is recovered from the eluate of an ion exchange process.

In a first embodiment according to the invention, there is provided a process including the steps of: a) providing a mixed nickel iron hydroxide product; b) pelletising the mixed nickel iron hydroxide product to produce nickel iron hydroxide pellets; c) calcining the nickel iron hydroxide pellets to produce mixed nickel iron oxide pellets; and d) reducing the nickel iron oxide pellets with one or more reducing gases at high temperatures to produce ferronickel pellets.

In general, the mixed nickel iron hydroxide product will be an intermediate product produced following the selective recovery of nickel and iron in an ion exchange process. In general, the process forms part of an overall process for the recovery of nickel as ferronickel from a laterite ore. In a preferred embodiment the mixed nickel iron hydroxide is produced by the following general process. A pregnant leachate solution is produced by a heap leach process, preferably a counter current heap leach process of a laterite nickel containing ore using sulfuric acid. The pregnant leachate containing at least nickel, cobalt and iron will then be treated by an ion exchange process, where the nickel and iron are extracted onto the resin, the cobalt remaining in the raffinate. The nickel and iron are then eluted from the resin with an acid, and precipitated as a mixed nickel iron hydroxide precipitate by treatment of the eluate with a neutralising agent such as magnesium oxide.

Accordingly, in a preferred embodiment of the invention, the process includes the further steps of: a) providing a product liquor containing at least nickel and iron; b) subjecting the product liquor to an ion exchange process wherein an ion exchange resin selectively absorbs nickel and iron from the product liquor; c) eluting the nickel and iron from the resin with an acid solution to produce an eluate containing nickel and iron; and; d) precipitating the nickel and iron as a mixed nickel iron hydroxide by treatment of the eluate with a neutralising agent.

In one embodiment, the neutralisation of the free acid in the nickel and iron loaded eluate is carried out in two stages. Limestone is used in a first neutralisation step to increase the pH to around 2, precipitating gypsum as the neutralisation product together with some goethite, which can be readily filtered out. Magnesium oxide and/or soda ash can then be used to further neutralise the eluate to a pH of greater than 7.5 to precipitate the nickel and iron as a mixed nickel iron hydroxide product. Alternatively, the magnesium oxide and/or soda ash can be used in a single step to raise the pH of the eluate to greater than 7.5 to precipitate the mixed nickel iron hydroxide product.

Most preferably, the acid used to strip the nickel and iron from the resin is sulfuric acid, to produce a nickel and iron loaded eluate. However, in yet a further embodiment, hydrochloric acid could be used rather than sulfuric acid to strip the nickel and iron from the resin. This will have the potential advantage in that the eluate can be neutralised with lower levels of sulfur present than would occur if sulfuric acid was used, resulting in lower levels of sulfur in the resultant mixed nickel iron hydroxide product. Therefore, depending on the levels of sulfur present, calcination can occur at a lower temperature prior to the reduction step.

The mixed nickel iron hydroxide product recovered from the ion exchange eluate is suitable for processing to the ferronickel pellets in accordance with the process of the invention. The mixed nickel iron hydroxide product would generally be in the form of a wet cake and in order to pelletise the mixed nickel iron hydroxide product, it is preferred that the wet cake is dried and pelletised with an organic binding material and water. This makes the nickel iron hydroxide pellet harder and easier to handle. The nickel iron hydroxide pellets range in size between 5 mm and 20 mm in diameter before calcination.

Preferred organic binding materials include a cellulose solution, starch or other viscous organic hydrocarbon polymers which are destroyed when temperatures exceed 500° C. Generally, the organic binding materials will be burnt off from the nickel iron oxide pellets during calcination.

In the preferred embodiment of the invention, the pelletised nickel iron hydroxide product is first dried at a temperature of about 100° C.-120° C. and then calcined, preferably at temperatures of about 800° C.-1300° C. under oxidising conditions to convert the nickel iron hydroxide pellets to nickel iron oxide pellets substantially free of sulfur. This produces porous nickel iron oxide pellets having a large specific surface area.

Generally, the calcination step will occur in a kiln, travelling grate, shaft furnace, multi-hearth furnace or any other suitable reactor for calcining such products. The oxidising conditions are provided by the addition of air or other oxidising gases within the reactor or through the solid bed.

Generally, if sulfuric acid has been used to strip the resin, any sulfur present is removed during the calcining step, generally as sulfur dioxide or sulfur trioxide. If hydrochloric acid is used to strip the resin, some magnesium chloride may be present and the temperature conditions of the calcining step may require modification during the calcining step to remove any chloride present.

The calcined porous nickel iron oxide pellets are then reduced with a reducing gas at temperatures of about 800° C.-1100° C. The most preferred reducing gas for reducing the calcined porous pellets of nickel iron oxide is hydrogen. However other reducing gases capable of producing a reducing atmosphere, such as carbon monoxide, methane or reformed natural gases and mixtures thereof, may also be used together, with or instead of hydrogen.

In a preferred embodiment of the invention, the process is applicable to recovering a ferronickel product from the product liquor from high pressure acid leach, enhanced pressure acid leach, atmospheric acid leach (or any combination of these) or heap leaching of laterite ores. The process may be applicable to treating any nickel containing product liquor from an acidic leach process, including the product liquor from the pressure oxidative leach of nickel containing sulfide ores or the combination of any laterite and nickel sulfide ore leach.

Accordingly, in a preferred embodiment the present invention provides a process for producing a ferronickel product from a product liquor containing nickel, cobalt and iron in a nickel recovery process, said process including the steps of: a) providing a product liquor containing at least nickel, cobalt and iron; b) subjecting the product liquor solution to an ion exchange process wherein an ion exchange resin selectively absorbs nickel and iron from the solution; c) stripping the nickel and iron from the resin with an acid solution to produce a loaded eluate; d) neutralising the loaded eluate to precipitate a mixed nickel iron hydroxide product; e) pelletising the mixed nickel iron hydroxide product to produce nickel iron hydroxide pellets; f) calcining the nickel iron hydroxide pellets to produce nickel iron oxide pellets; and g) reducing the nickel iron oxide pellets with one or more reducing gases at high temperatures to produce ferronickel pellets The nickel and iron are separated from cobalt by the ion exchange process, the resin preferably having a bis-picolylamine functional group, and that when operated at a pH of about 2, the resin is able to selectively retain nickel and iron and separate the nickel and iron from cobalt and remove other impurities. The nickel and iron will be loaded on to the resin, while most of the cobalt remains in the raffinate. The cobalt may be recovered from the raffinate by conventional techniques such as solvent extraction, ion exchange, or precipitation as a sulfide, carbonate or hydroxide.

Any copper that may be present in the product liquor should be removed prior to the ion exchange process as some resins have a higher affinity to copper than nickel and iron. The copper is readily removed from the product liquor by ion exchange, solvent extraction or other known techniques.

The ferronickel product produced by the process of the present invention will generally have a higher magnesium content than normally found in ferronickel products and lower levels of sulfur. The higher level of magnesium is a desirable feature if the ferronickel is to be used for stainless steel manufacture as the magnesium is required in slag production.

Accordingly, in yet a further embodiment, the present invention resides in a unique porous ferronickel pellet product. The unique physical characteristics of this product make it particularly suitable for direct addition to a stainless steel melt in that the product is of sufficient purity as the majority of the impurities have been removed following selective nickel/iron ion exchange processing and the product contains low levels of sulfur after calcining. Although the level of magnesium in the product is higher than normally found in ferronickel products, this is not a detriment as the magnesium is useful for slag production during stainless steel manufacture. Preferably, the porous ferronickel product will have a magnesium content of between 1% and 10% and a sulfur content of below 0.4% and a carbon content between 0.01% to 2.5%.

The ferronickel pellets produced from the process are suitable for addition to stainless steel furnaces or may be used for other applications. If a high purity ferronickel is required, the ferronickel pellets may be further refined or smelted and cast to ingots.

Accordingly, in yet a further embodiment, the porous ferronickel pellets can be further smelted and refined to produce a high purity ferronickel product. The smelting process includes the steps of: a) providing the porous ferronickel pellets produced in accordance with the process of the invention; and b) adding a flux to dissolve any inclusions; and c) smelting the product in a furnace at a temperature of at least 1500° C. to produce a high purity ferronickel product.

Generally, the inclusions are likely to be magnesium oxide, alumina, silica, calcium oxide and/or chromium oxide. The flux should have a high solubility for each of these inclusions and a liquidus temperature of between 1400° C.-1450° C. A preferred flux has the system $CaO—Al_2O_3—CaF_2$.

PROCESS DESCRIPTION

In a preferred embodiment, where the product liquor solution results from an acid heap leach process, laterite ore is crushed to a size, preferably less than 25 mm size and agglomerated using water, sulfuric acid, or other binding materials, to improve heap permeability.

The agglomerated ore may be arranged into at least one heap but preferably at least two heaps, a primary and a secondary heap, to be operated as a counter current heap leach system. The counter current heap leach process has the advantage of lower acid consumption, and a cleaner product solution than the single heap system.

Figure 1:
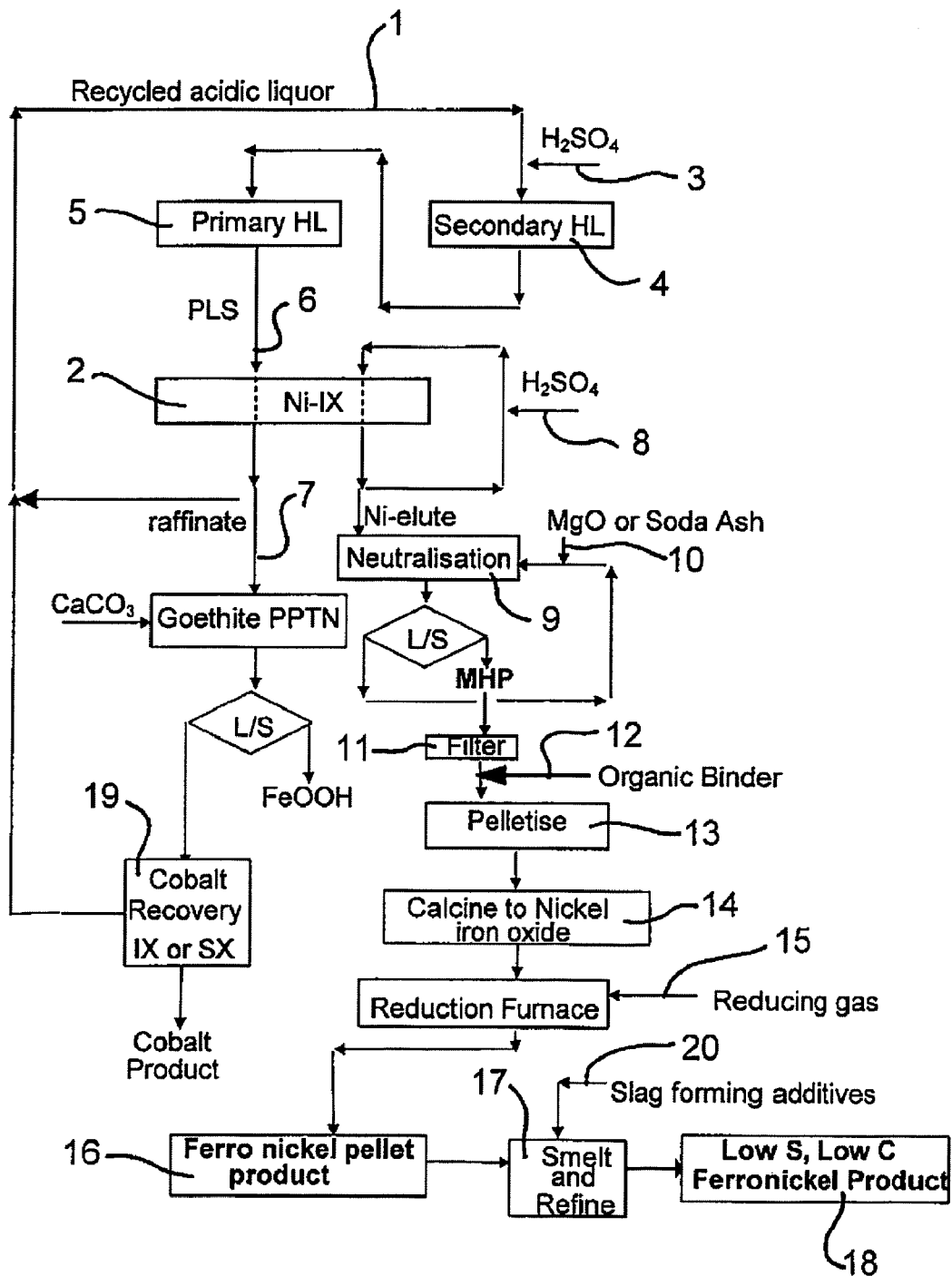
FIG. 1 illustrates a preferred flowsheet in accordance with the process of the invention.

In a preferred method, which is illustrated in FIG. 1, the leach solution is sourced from the nickel depleted recycled raffinate (1) from the nickel ion exchange step (2), supplemented with sulfuric acid (3), and added to the secondary heap (4) producing an intermediate product liquor solution, which is then added to the primary heap leach (5) in a counter current process. This produces a nickel and cobalt rich product liquor solution (PLS) (6) with low acidity, which also contains iron and a number of other impurities. When the secondary heap is depleted of nickel, it is discarded, the primary heap becomes the secondary heap, and a new ore heap becomes the primary heap.

The product liquor solution is treated by an ion exchange (IX) process (2), where the majority of the nickel and some of the iron is retained on the resin bed, and the major portion of the iron, other impurities, and the cobalt remain in the raffinate solution and pass through. The resin for example, is Dowex M4195 with a functional group of bis-picolylamine. At pH2 the absorption constants indicating selectivity of the resin are in the order: $Ni^{+2}>Fe^{+3}>Co^{+2}>Fe^{+2}>Mn^{+2}>Mg^{+2}>Al^{+3}$. Therefore the resin can recover nickel at pH2 and remove other impurities with exception of iron.

As Dowex M4195 has a much higher affinity for copper than nickel and iron, if the process is being used to treat the product liquor from the oxidative leach of a sulfide ore, the copper is removed from the product liquor prior to treating the product liquor to the ion exchange step.

The raffinate (7), containing the cobalt can be further treated by known solvent extraction, ion exchange, or precipitation techniques (19) to extract the cobalt and recover it as cobalt sulfide or cobalt hydroxide.

The retained nickel and iron are eluted from the resin using sulfuric acid solution (8). Hydrochloric acid may be used as an alternative, but sulfuric acid is preferred. If hydrochloric acid is used, less sulfur will be present in the eluate and the calcining conditions may be modified to remove any chloride present. Previous work carried out on nickel processing has used IX systems to produce a pure nickel eluate, or an eluate containing the nickel and cobalt values. The use of the IX step in this process however, is used to produce a nickel and iron mixture in the eluate suitable for further processing to ferronickel or nickel matte. This reduces the amount of iron to be neutralised and rejected, reducing the size of the downstream equipment.

The IX eluate is neutralised (9), preferably with magnesium oxide and/or soda ash (10), to precipitate a mixed nickel iron hydroxide, which is filtered (11) to produce a wet cake.

It has been surprisingly found that by treatment of the wet nickel iron hydroxide product filter cake by the following process steps, a ferronickel pellet product of acceptable purity is produced that can be used directly in a stainless steel furnace as a source of nickel and iron.

The wet nickel iron hydroxide product is mixed with organic binding material (12) in aqueous solution, to make pellets in a pelletiser or extruder (13). The binding material may typically be 0.05% cellulose solution, but other types of suitable material may be used such as starch, or other viscous organic hydrocarbon carbon polymers which are destroyed at above 500° C. The pellet size ranges between 5 mm and 20 mm diameter. The analysis of the nickel iron hydroxide product at this point is indicated in Table 11 as the low sulfur nickel iron hydroxide product. It contains a substantial moisture content and between 1 and 4% sulfur at this point which should be reduced before smelting.

The pellets are dried at 110° C. and fed into horizontal furnace, such as a rotary kiln, or vertical furnace such as a shaft furnace, or other suitable industrial equipment, for calcination (14) at between 1000° C. and 1300° C. under oxidising conditions. The moisture is driven off by 400° C., and the sulfur, which is removed as sulfur dioxide or sulfur trioxide, is almost completely removed after two hours at 1100° C. The metals in the product from the furnace are mainly in the form of trevorite, a complex nickel iron oxide $NiFe_2O_4$ and the product is in the form of porous pellets.

In an alternative embodiment, if hydrochloric acid is used to strip the nickel and iron from the IX resin rather than sulfuric acid, the level of sulfur present in the nickel iron hydroxide pellets may be sufficiently low to obviate the need to calcine the pellets prior to the reduction step or at least reduce the temperature at which these pellets are calcined. Therefore the separate calcination step as illustrated in FIG. 1 may not be necessary in this embodiment.

The porous metal oxide pellets are then treated with a reducing gas (15) preferably between 800° C. and 1100° C., more preferably about 1000° C., in a packed bed in a furnace, where they are reduced to ferronickel pellets (16). The reducing gas is preferably hydrogen, but may be carbon monoxide or other mixtures of gases which produce a suitable reducing atmosphere. The typical analysis of the ferronickel pellets produced is indicated in Table 1 below:

TABLE 1

| Component | | | | | | |
|---|---|---|---|---|---|---|
| Fe | Ni | S | C | MgO | $Mg_2SiO_4$ | $CaO \cdot MgO \cdot SiO_2$ |
| Percentage 54 | 41 | 0.01 | 0.13 | 4.1 | 0.6 | 0.3 |

The magnesium content of the product, which is a residual from the precipitation of the mixed hydroxide with magnesium oxide and may be difficult to wash from the filter cake, is higher than would normally be found in ferronickel. However, this is a desirable component for stainless steel manufacture as it is required in the slag production. The porous ferronickel pellets are suitable therefore, for direct addition to stainless steel furnaces and represent a novel ferronickel product.

If required, as a further embodiment, the porous ferronickel pellets can be further smelted and refined (17) to produce a high quality ferronickel product low in sulfur and carbon (18).

Since the main purpose of the smelting stage is to remove the non-metallic inclusions in the reduced ferronickel, a flux is added (20) to the melt which will have the capacity to dissolve the inclusions. The major inclusions are MgO and to a smaller extent alumina, silica, calcium oxide and chromium oxide.

As the ferronickel pellets contain virtually no sulfur, the preferred design criteria for the flux are a high solubility for MgO, and/or any of the other inclusions that may be found, a liquidus temperature between 1400° C. and 1450° C., limited solubility of the refractory material, non-toxic or hazardous and easily disposable, and low cost.

MgO dissolves in commonly used fluxes only to a limited extent due to its refractory nature, i.e. high melting point (2822° C.) and thermodynamic stability. The targeted smelting temperature is between 1550° C. and 1580° C.

Slags in the system $CaO—Al_2O_3—CaF_2$ have reasonable solubility of MgO, which may be as high as 20 wt. % at 1550° C. A typical flux used to smelt the ferronickel pellets is 41% $CaO$-41% $Al_2O_3$-18% $CaF_2$ but other fluxes which fulfil the same function may be used. Since the overall content of MgO in the reduced ferronickel is approximately 4.3%, the mass of flux required in the treatment is approximately 25% of the mass of the reduced ferronickel.

After selection of the appropriate flux, the porous ferronickel pellets may be smelted together with the slag at a temperature of at least 1500° C. preferably around 1600° C. in a suitable industrial furnace, producing a high quality ferronickel product.

The obtained ferronickel contains below 30 ppm sulfur, which is ten times lower than the maximum limit prescribed by ISO 6501 for ferronickel grades FeNi40 LC and FeNi40LCLP. The carbon content is below 100 ppm while the maximum level according to the standard is 300 ppm.

The chemical composition of the ferronickel after smelting and refining is represented in Table 2 below.

TABLE 2

Chemical composition of the ferronickel after smelting

| | Element | | | | | | | | | | | | | | |
|---|---|---|---|---|---|---|---|---|---|---|---|---|---|---|---|
| Units | Ni wt % | Fe wt % | Al ppm | As ppm | Cd ppm | Co ppm | Cr ppm | Cu ppm | P ppm | Pb ppm | Sb ppm | Si ppm | C ppm | S ppm | O ppm |
| Content | 44 | 55 | 110 | 110 | 0 | 2200 | 310 | 440 | 380 | 0 | 0 | 230 | <100 | <30 | 14 |

A further advantage of the process described is that, as a consequence of the high selectivity of the nickel ion exchange process step for nickel and iron, the impurity levels in the nickel iron hydroxide product, and consequently in the ferronickel produced are significantly lower than those currently achieved by the majority of commercial producers, and even those in the "super pure" ferronickel grade.

The new process has a further advantage over the current hydrometallurgical routes, in that it has fewer process steps to convert ore to a finished ferronickel product, and heap leaching is generally less capital intensive than other leach processes.

Also, part of the iron content of the original ore becomes an ingredient of the final ferronickel product, the capacity of the plant required for iron removal following leaching is smaller than the iron removal sections of current hydrometallurgical routes. The iron recovered, which is normally lost in hydrometallurgical processes, also adds value to the final ferronickel product.

EXAMPLES

Example 1

Single Column Leaching with Sulfuric Acid Only

To simulate heap leaching with sulfuric acid only, 65.6 kg saprolite ore with moisture content of 20.1% was agglomerated with 98% sulfuric acid to pelletise the material with particle size of 3.35 mm to 25.4 mm. The acid dose for agglomeration was 20 kg per tonne of dry ore. The column size was 15 cm diameter×262 cm height. Sulfuric acid solution with acidity of 50 g/L was fed to column with the flux of 40 Liter/(hr.m$^2$). The nickel extraction was 94% after 52 days. Table 3 summarizes the results.

TABLE 3

Column Leaching Results with Sulfuric Acid only

| | Weight kg | Al % | Co % | Cr % | Fe % | Mg % | Mn % | Ni % |
|---|---|---|---|---|---|---|---|---|
| Feed ore | 52.5 | 0.812 | 0.033 | 0.53 | 11.0 | 16.0 | 0.174 | 2.21 |
| Residue | 30.3 | 0.920 | 0.000 | 0.68 | 4.77 | 5.58 | 0.04 | 0.24 |
| Extraction % | | 34.61 | 100 | 25.96 | 74.97 | 79.87 | 86.73 | 93.73 |

Example 2

Single Column Leaching Fed with a Limonite Acid Leachate

To simulate heap leaching with acidic, nickel and cobalt containing solution e.g. pressure acid leaching PAL) or atmospheric acid leaching (AAL), 80.4 kg saprolite ore with moisture of 24.0% was agglomerated with 98% sulfuric acid to make the pellets with particle size of 3.35 mm to 25.4 mm. The acid dose for agglomeration was 25 kg per tonne of dry ore. The column size was 15 cm diameter×386 cm height. The acidic leachate from a limonite pressure leach containing nickel, cobalt and iron in solution, was fed to the column with a flux of 10 Liter/(hr.m$^2$). The composition of this feed solution is shown in Table 4. The nickel extraction was 76% at 197 days. Table 5 summarizes the results.

TABLE 4

Composition of limonite acid leachate

| Acidity g/L | Al mg/L | Co mg/L | Cr(VI) mg/L | Fe mg/L | Mg mg/L | Mn mg/L | Ni mg/L |
|---|---|---|---|---|---|---|---|
| 30-40 | 4550 | 730 | 350 | 3450 | 4750 | 3990 | 8550 |

TABLE 5

Column Leaching Results with Acidic leachate

| | Weight kg | Al % | Co % | Cr % | Fe % | Mg % | Mn % | Ni % |
|---|---|---|---|---|---|---|---|---|
| Feed ore | 61.1 | 1.61 | 0.055 | 0.88 | 17.2 | 10.8 | 0.388 | 1.8 |
| Residue | 41.0 | 1.71 | 0.005 | 1.04 | 13.6 | 5.0 | 0.410 | 0.63 |
| Extraction % | | 28.56 | 38.85 | 20.01 | 46.81 | 68.86 | 28.92 | 76.46 |

Examples 3

Counter-Current Leaching

In order to simulate the counter current leaching process, a group of counter-current column leaches were carried out with a constant acid consumption of 670 kg H$_2$SO$_4$/t ore. The group contains five columns named as A, B, C, D and E. Column A was firstly fed with acidic intermediate product liquor solution (IPLS) obtained from previous column leaching (simulating the secondary leach effluent liquor) to simulate primary leaching, then fed with blank sulfuric solution of 100 g/l H$_2$SO$_4$ to simulate secondary leaching, and finally rinsed with pH2 dilute H$_2$SO$_4$ solution. The Product liquor solution from the primary leaching was stored for nickel recovery with IX. The IPLS from the secondary leaching and rinsing was used as feed solution to column B as primary leaching and so-on. Only the results of column B, C, D and E are quoted because these columns had the same initial conditions. The operation time of each column was about 30 days.

26 kg saprolite ore with a moisture content of 23.1% was agglomerated with 98% sulfuric acid to make pellets with particle size of 3.35 mm to 25.4 mm. The acid dose for agglomeration was 25 kg per tonne of dry ore. The column size was 10 cm diameter×305 cm height. The feed flux was 40 Liter/(hr.m$^2$). The nickel extraction was over 80%. The composition of feed ore is shown in Table 6. The extraction of Ni, Fe and Mg were calculated with three different methods and are shown in Table 7. The composition of primary leaching PLS (Table 8) indicated that this PLS contained low acid levels and entrained solid and can be directly fed to IX step for nickel recovery.

TABLE 6

Composition (%) of the Ore Charged to Column

| ID | Al | Ca | Co | Cr | Cu | Fe | Mg | Mn | Ni | Pb | S | Si | Ti | Zn |
|---|---|---|---|---|---|---|---|---|---|---|---|---|---|---|
| 670A | 1.07 | 0 | 0.04 | 0.66 | 0 | 11.9 | 16.5 | 0.20 | 2.23 | 0.01 | 0 | 23.7 | 0.00 | 0.04 |
| 670B | 0.97 | 0 | 0.04 | 0.63 | 0 | 11.6 | 15.9 | 0.19 | 2.06 | 0.01 | 0 | 22.8 | 0.00 | 0.03 |
| 670C | 0.94 | 0 | 0.04 | 0.60 | 0 | 10.9 | 14.7 | 0.19 | 2.14 | 0.01 | 0 | 21.0 | 0.03 | 0.03 |
| 670D | 1.00 | 0 | 0.04 | 0.63 | 0 | 11.7 | 16.4 | 0.19 | 2.07 | 0.01 | 0 | 23.2 | 0.00 | 0.03 |
| 670E | 1.04 | 0 | 0.04 | 0.63 | 0 | 11.5 | 15.9 | 0.20 | 2.21 | 0.01 | 0 | 22.5 | 0.00 | 0.03 |

TABLE 7

Results of Counter-current Column Leaching
(Acid Consumption: 670 kg/t ore)

| | Acid Consumption | | Ni extraction % | | | Fe extraction % | | | Mg extraction % | | |
|---|---|---|---|---|---|---|---|---|---|---|---|
| | kg/t | kg/kg | | | | | | | | | |
| I.D | ore | $Ni^{(3)}$ | $L/H^{(1)}$ | $L/T^{(2)}$ | $T/H^{(3)}$ | $L/H^{(1)}$ | $L/T^{(2)}$ | $T/H^{(3)}$ | $L/H^{(1)}$ | $L/T^{(2)}$ | $T/H^{(3)}$ |
| 670B | 645 | 39 | 87.9 | 82.1 | 80.8 | 45.5 | 48.1 | 50.9 | 69.1 | 60.5 | 54.9 |
| 670C | 601 | 35 | 85.5 | 81.1 | 80.1 | 44.4 | 46.7 | 49.3 | 57.4 | 58.0 | 58.4 |
| 670D | 608 | 36 | 88.6 | 82.8 | 81.6 | 44.4 | 45.2 | 46.2 | 62.9 | 60.6 | 59.1 |
| 670E | 649 | 38 | 85.3 | 84.4 | 84.2 | 47.5 | 53.7 | 59.0 | 64.7 | 63.8 | 63.4 |
| Ave. | 626 | 37 | 86.8 | 82.6 | 81.7 | 45.5 | 48.4 | 48.4 | 63.5 | 60.7 | 58.9 |

$^{(1)}$Calculated using PLS and ore analysis
$^{(2)}$Calculated using PLS and tailings analysis
$^{(3)}$Calculated using tailing and ore analysis

TABLE 8

Major Content of the Final PLS

| Column ID | Vol. liter | pH | $H_2SO_4$ g/L | Ni g/L | Mg g/L | Fe g/L | Solid Conc. mg/L |
|---|---|---|---|---|---|---|---|
| 670B | 143 | 2.3 | 0 | 2.04 | 11.47 | 7.10 | 5 |
| 670C | 141 | 2.2 | 0 | 2.79 | 14.95 | 8.11 | 11 |
| 670D | 141 | 2.0 | 1.5 | 2.80 | 15.10 | 7.60 | 18 |
| 670E | 139 | 1.5 | 3.1 | 2.60 | 14.70 | 7.80 | 14 |

TABLE 9

Composition of IX Feed, Raffinate and Eluate

| Liquid Stream | Al mg/L | Co mg/L | Cr mg/L | Fe mg/L | Mg mg/L | Mn mg/L | Ni mg/L |
|---|---|---|---|---|---|---|---|
| Feed | 234 | 52 | 127 | 12137 | 16221 | 303 | 2887 |
| Raffinate | 229 | 27 | 113 | 5869 | 15415 | 289 | 61 |
| Ni-eluate | 0 | 30 | 7 | 9956 | 7 | 1 | 5609 |

Example 4

Nickel Recovery with IX

PLS obtained from counter-current column heap leaching of rocky saprolite was processed through a 250 mL resin column of Dowex M4195 resin at a flow rate of 25 mL/min. Nickel and some iron are loaded onto the resin, separating them from other impurities and the remaining iron which pass through in the raffinate. The nickel and iron-containing eluate was obtained with stripping the IX column with 150 g/L $H_2SO_4$. Table 9 illustrates the composition of feed, raffinate and Ni-eluate. The ratio of nickel to iron achieved in the eluate is suitable to achieve a good feed material for ferronickel production.

Example 5

Nickel Recovery with Counter-Current IX

240 Liters of heap leaching PLS was neutralized with limestone to pH2. After solid/liquid separation, the PLS was treated with IX columns filled with Dowex M4195 resin for nickel recovery and impurity separation with a counter-current style operation. The Bed Volume (BV) of resin was 20 Liter. Five BV (100 liters) of PLS with pH2 and two BV (40 liter) of rinse water were consecutively fed to the column to create an intermediate raffinate. The intermediate raffinate was neutralized with limestone to pH2 and then fed to secondary column to create the final raffinate for cobalt recovery. Directly after feeding the neutralized intermediate raffinate, another five BV (100 liter) PLS was fed to the same IX column to create the intermediate raffinate and so on. The fully loaded IX column was then consecutively rinsed with 2 BV (40 liter) water, stripped with 1 BV 150 g/L $H_2SO_4$ and rinsed with 2 BV water. Approximately a half BV (10 liter) of eluate that contained high concentration nickel and low concentration acid was collected as product for making ferronickel. Approximately one BV (20 liter) eluate that contained low concentration nickel and high concentration acid was collected for making stripping solution for next IX cycle with acidification. Table 10 illustrates the average concentration of feed, intermediate raffinate, final raffinate and Nickel-eluate (product).

TABLE 10

Composition of Liquid Streams with Counter-current IX operation

| Liquid Stream | $H_2SO_4$ g/L | Al mg/L | Co mg/L | Cr mg/L | Fe mg/L | Mg mg/L | Mn mg/L | Ni mg/L |
|---|---|---|---|---|---|---|---|---|
| Feed PLS, pH 2 | 0 | 1600 | 120 | 210 | 13000 | 6200 | 680 | 2600 |
| Intermediate raffinate | 1.9 | 1100 | 110 | 160 | 11000 | 5100 | 460 | 250 |
| Final raffinate | 5.8 | 1100 | 47 | 150 | 4500 | 5700 | 440 | 5 |
| Ni-eluate, product | 12.7 | 0 | 140 | 12 | 23000 | 0 | 0 | 19000 |
| Recycled Ni-elute | 83.7 | 0 | 6 | 1 | 1400 | 0 | 0 | 3200 |

Example 6

Nickel Iron Hydroxide Precipitation (NIHP) Production 15 liters of Ni-elute (product) shown in Table 10 in Example 5 was neutralized with $MgCO_3$ and MgO slurry to precipitate a nickel iron hydroxide product. The neutralization involved two stages: iron precipitation as para-goethite at pH2 and 80° C. with the $MgCO_3$ and nickel precipitation at pH7.5 with the MgO. 848 grams nickel iron hydroxide product was produced with the composition shown in Table 11 with a Ni/Fe ratio of 0.75. Sulfur content (2.6%) was mostly balanced with Mg content (1.5%) as $MgSO_4$. This indicated there was $MgSO_4$ entrained in the moisture of the filter cake.

TABLE 11

Composition of Ni/Fe Hydroxide Precipitate

| Stream | Wt g | Ca % | P % | Cr % | Si % | Fe % | Mg % | $H_2O$ % | Ni % | S % | Zn % |
|---|---|---|---|---|---|---|---|---|---|---|---|
| Low-S Nickel Iron Hydroxide for Ferronickel production[1] | 848 | 0.4 | 0.01 | 0.02 | 0.12 | 30.6 | 1.5 | 17.6 | 23.1 | 2.6 | 0.07 |

[1]Iron precipitated with $MgCO_3$ and nickel precipitated with MgO

Example 7

Calcination of Nickel Iron Hydroxide Pellets

In order to establish the degree of sulfur removal in the gas phase, samples of the nickel iron hydroxide product material produced in example 6 were heated to 500, 1100 and 1350° C., respectively and the products subjected to chemical analysis. The heating was carried out in air in order to prevent reduction of the iron and nickel as well as the sulfates contained in the sample, which might lead to formation of sulfides, particularly in the range above 1000° C.

TABLE 12

Chemical analysis of the As Received and Heated Nickel Iron Hydroxide Product

| Element | As received wt. % | 500° C. wt. % | 1100° C. wt. % | 1350° C. wt. % |
|---|---|---|---|---|
| Fe | 30.6 | 35.6 | 40.4 | 40.4 |
| Ni | 23.1 | 27.3 | 30.8 | 30.8 |
| Mg | 1.5 | 1.7 | 1.9 | 2.0 |

TABLE 12-continued

Chemical analysis of the As Received and Heated Nickel Iron Hydroxide Product

| Element | As received wt. % | 500° C. wt. % | 1100° C. wt. % | 1350° C. wt. % |
|---|---|---|---|---|
| Ca | 0.4 | 0.13 | 0.09 | 0.11 |
| Si | 0.12 | 0.13 | 0.16 | 0.16 |
| P | 0.01 | 0.02 | 0.02 | 0.02 |
| S | 2.6 | 2.7 | 0.01 | 0.01 |
| $H_2O$ | 17.6 | 0 | 0 | 0 |

It was found that virtually all sulfur was removed by heating and keeping the sample at 1100° C. for 2 hours. No benefits were obtained in heating to higher temperatures. This finding is significant in that in any subsequent treatment steps, sulfur content is not a significant factor, and thus reduces the demands on the slags required in a possible smelting stage.

Example 8

Small Scale Reduction of Calcined Nickel Iron Hydroxide Product

In order to establish the reduction rates associated with hydrogen and carbon monoxide reduction, small-scale experiments were conducted using 1.1 g sintered material produced via the steps described in example 7 above. The reduction of the pellets was carried out in a thermo-gravimetric apparatus (TGA).

The composition of gases used in the reduction were 50 vol. % $H_2$—Ar or 50 vol. % CO—Ar. The total flow of the gas was 4 L/min. The composition of the gas was selected arbitrarily, but certainly if hydrogen is to be used its concentration in a large scale process is likely to be higher, which will translate into reduction rates higher than the ones described below.

The selected temperature of reduction was 1000° C. During reduction of the nickel and iron oxides, oxygen is gradually removed to eventually form metallic nickel and iron. Hence, the loss in mass (of oxygen) is monitored by the TGA, and the degree of reduction can be calculated as a percentage of the original mass of sample.

Figure 2:
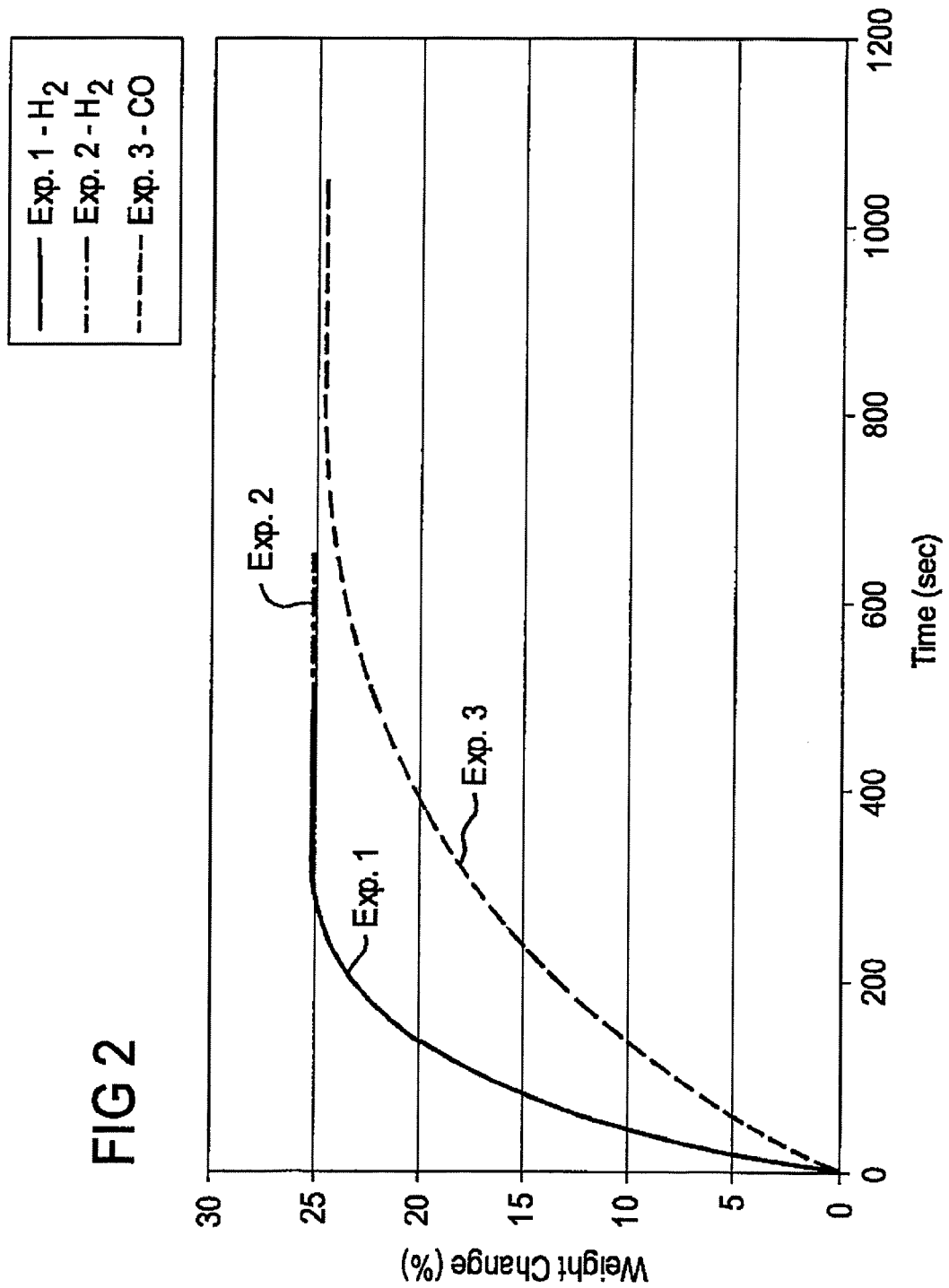
FIG. 2 illustrates the weight change during reduction of the nickel iron oxide pellets using hydrogen and carbon monoxide are the reductants.

The weight change during reduction by H2 and CO is represented in FIG. 2.

Two experiments were carried out using hydrogen in order to test the reproducibility of reduction. The experiments showed that the reduction by hydrogen was approximately 2.5 times as fast as by carbon monoxide. The achieved weight loss was 25.05% after hydrogen reduction and 24.5% after CO reduction.

Example 9

Reduction of Calcined Nickel Iron Oxide Pellets

The mass of nickel iron oxide obtained after sintering the dried, pelletised and calcined material produced in example 8 was 480.4 grams. This was reduced using 60 vol % carbon monoxide, 40% nitrogen gas mixture with a gas flow rate of 15 L/min, in a thermogravimetric apparatus at 960° C.

It took approximately 60 min to reduce the nickel and iron in the sample. The weight loss during reduction was 25.1%. Approximately 60% shrinkage was observed from the original size of nickel iron oxide pellets.

Virtually no decrepitation took place during reduction. The composition of the reduced pellets is shown in table 13.

TABLE 13

Composition of Wet NHP and the Pellets Obtained at Various Conditions

| Element | As Wet NHP Filter cake wt. % | After Pelletisation and calcination at 1100° C. wt. % | After reduction wt % |
|---|---|---|---|
| Fe | 30.6 | 40.4 | 54 |
| Ni | 23.1 | 30.8 | 41 |
| Mg | 1.5 | 1.9 | |
| Ca | 0.4 | 0.09 | |
| Si | 0.12 | 0.16 | |
| P | 0.01 | 0.02 | |
| S | 2.6 | 0.01 | 0.01 |
| $H_2O$ | 17.6 | 0 | |
| C | | | 0.13 |
| MgO | | | 4.1 |
| $Mg_2SiO_4$ | | | 0.6 |
| $CaO \cdot MgO \cdot SiO_2$ | | | 0.3 |

The magnesium content of the product, although higher than would normally be found in ferronickel, is a desirable ingredient for stainless steel manufacture as it is required in the slag production process.

This material can be viewed as a marketable product.

Example 10

Smelting and Refining of Ferronickel Pellets

In order to produce high quality ferronickel, the reduced pellets have to be subjected to smelting and refining. The main purpose of the smelting stage is to remove the non-metallic inclusions in the reduced ferronickel, and slag with the capacity to dissolve them has to be added. The major inclusions are MgO and to a smaller extent CaO and $SiO_2$.

MgO dissolves in commonly used slags only to a limited extent due to its refractory nature, i.e. high melting point (2822° C.) and thermodynamic stability. The slag candidate had to have as high as possible solubility of MgO in order to minimise its mass. At the same time its liquidus temperature had to be in the range of 1400 to 1450° C. because the targeted smelting temperature was between 1550 and 1580° C.

The flux used in this test was 41% CaO-41% $Al_2O_3$-18% $CaF_2$. The slag was pre-melted in a platinum crucible in air at 1600° C. and quenched on a copper plate.

The reduced ferronickel produced in Example 9 was smelted in a high-temperature $MoSi_2$ resistance furnace. 194.4 grams of reduced ferronickel and 41.6 g of slag were introduced in an $Al_2O_3$ crucible and heated up to 1580° C. in a stream of 5% $H_2$—$N_2$ gas. The molten system was maintained at that temperature for two hours and then cooled under reducing conditions.

The chemical composition of the ferronickel after smelting and refining is represented in Table 14.

TABLE 14

Chemical Composition of the Ferronickel after Smelting

| Units | Ni wt % | Fe wt % | Al ppm | As ppm | Cd ppm | Co ppm | Cr ppm | Cu ppm | P ppm | Pb ppm | Sb ppm | Si ppm | C ppm | S ppm | O ppm |
|---|---|---|---|---|---|---|---|---|---|---|---|---|---|---|---|
| Content | 44 | 55 | 110 | 110 | 0 | 2200 | 310 | 440 | 380 | 0 | 0 | 230 | <100 | <30 | 14 |

The obtained ferronickel contained sulfur below 30 ppm, which is ten times lower than the maximum limit prescribed by ISO 6501 for ferronickel grades FeNi40 LC and FeNi40LCLP. The carbon content is below 100 ppm while the maximum level according to the standard is 300 ppm.

The above description is intended to be illustrative of the preferred embodiment of the present invention. It should be understood by those skilled in the art, that many variations or alterations may be made without departing from the spirit of the invention.

The invention claimed is:

1. A process for producing a ferronickel product from a mixed nickel iron hydroxide product, said process including the steps of:
    a) providing a mixed nickel iron hydroxide product;
    b) pelletising the mixed nickel iron hydroxide product to produce nickel iron hydroxide pellets;
    c) calcining the nickel iron hydroxide pellets to produce mixed nickel iron oxide pellets; and
    d) reducing the nickel iron oxide pellets with one or more reducing gases at high temperatures to produce ferronickel pellets.

2. A process according to claim 1 wherein the mixed nickel iron hydroxide product is an intermediate product produced following the selective recovery of nickel and iron in an ion exchange process.

3. A process according to claim 2 wherein the nickel and iron are recovered in an ion exchange process including the further steps of:
    a) providing a product liquor containing at least nickel and iron;
    b) selectively extracting the nickel and iron from the product liquor on to an ion exchange resin in an ion exchange step;
    c) eluting the nickel and iron from the resin with an acid to produce an eluate containing nickel and iron; and
    d) precipitating the nickel and iron as a mixed nickel iron hydroxide precipitate by treatment of the eluate with a neutralising agent.

4. A process according to claim 3 wherein the neutralising agent is magnesium oxide and/or soda ash.

5. A process according to claim 3 wherein;
    a) free acid in the eluate is first partially neutralised with a neutralising agent;
    b) separating the unused neutralisation products from the partially neutralised eluate; and
    c) neutralising the eluate further to a pH of greater than 7.5 to precipitate the nickel and iron as a mixed nickel iron hydroxide product.

6. A process according to claim 5 wherein the neutralising agent used to partially neutralise the free acid in the eluate is limestone.

7. A process according to claim 5 wherein the neutralising agent that is used to raise the pH of the eluate to greater than 7.5 is magnesium oxide and/or soda ash.

8. A process according to claim 3 wherein the acid used to strip the nickel and iron from the resin is sulfuric acid or hydrochloric acid.

9. A process according to claim 3 wherein sulfuric acid is used to strip the nickel and iron from the resin.

10. A process according to claim 3 wherein the mixed nickel iron hydroxide product is recovered from the ion exchange eluate in the form of a wet cake and is dried and pelletised with an organic binding material and water in a pelletiser or extruder.

11. A process according to claim 10 wherein the binding material is selected from a cellulose solution, starch or other suitable viscous organic hydrocarbon polymers which are destroyed when temperatures exceed 500° C.

12. A process according to claim 11 wherein the nickel iron hydroxide pellets range in size between 5 mm and 20 mm diameter.

13. A process according to claim 1 wherein the nickel iron hydroxide pellets are calcined under oxidising conditions at a temperature of about 800° C.-1300° C. and are converted to mixed nickel iron oxide pellets substantially free of sulfur.

14. A process according to claim 13 wherein the nickel iron hydroxide pellets are calcined in a kiln, travelling grate, shaft furnace or multi-hearth furnace.

15. A process according to claim 13 wherein the oxidising conditions are provided by the addition of air or other oxidising gases within the reactor or through the solid bed.

16. A process according to claim 1 wherein the pelletised nickel iron hydroxide product is dried at a temperature of about 100° C.-120° C. prior to calcination.

17. A process according to claim 1 wherein the nickel iron oxide pellets are reduced with a reducing gas at a temperature of about 800° C.-1100° C.

18. A process according to claim 17 wherein the reducing gas for reducing the calcined pellets of nickel iron oxide contains hydrogen, carbon monoxide, methane, reformed natural gas or mixtures thereof.

19. A process according to claim 3 wherein the ion exchange resin is a resin having a bis-picolylamine functional group and the ion exchange process is operated at a pH of about 2 in order selectively retain nickel and iron and remove other impurities.

20. A process according to claim 1 wherein the calcined nickel iron oxide pellet is a porous pellet.

21. A process for producing a ferronickel product from a product liquor containing nickel, cobalt and iron in a nickel recovery process, said process including the steps of:
    a) providing a product liquor containing at least nickel, cobalt and iron;
    b) subjecting the product liquor solution to an ion exchange process wherein an ion exchange resin selectively absorbs nickel and iron from the solution;
    c) stripping the nickel and iron from the resin with an acid solution to produce a loaded eluate;
    d) neutralising the loaded eluate to precipitate a mixed nickel iron hydroxide product;
    e) pelletising the mixed nickel iron hydroxide product to produce nickel iron hydroxide pellets;
    f) calcining the nickel iron hydroxide pellets to produce mixed nickel iron oxide pellets; and
    g) reducing the nickel iron oxide pellets with one or more reducing gases at high temperatures to produce ferronickel pellets.

22. A process according to claim 21 wherein the product liquor containing at least nickel, cobalt and iron is the product liquor from high pressure acid leach, enhanced pressure acid leach, atmospheric acid leach or heap leaching of laterite ores, or the product liquor from the oxidative leach of a nickel containing sulfide ore or combinations thereof.

23. A process according to claim 21 wherein the majority of any copper present is removed from the product liquor prior to the ion exchange process.

24. A process according to claim 21 wherein the nickel and iron are separated from cobalt by the ion exchange process, most of the cobalt remaining in the raffinate.

25. A process according to claim 21 wherein the cobalt is recovered from the raffinate by solvent extraction, ion exchange, precipitation as a sulfide, carbonate or hydroxide or other conventional techniques.

26. A process for producing a high purity ferronickel product including the steps of:
   a) providing a porous ferronickel pellet produced in accordance with claim 1;
   b) adding a flux to dissolve any inclusions; and
   c) smelting the product in a furnace at a temperature of at least 1500° C. to produce a high purity ferronickel product.

27. A process according to claim 26 wherein the inclusions include magnesium oxide, alumina, silica, calcium oxide and chromium oxide.

28. A process according to claim 26 wherein the flux has a high solubility for magnesium oxide, alumina, silica, calcium oxide or chromium oxide and a liquidus temperature of between 1400° C.-1450° C.

29. A process according to claim 28 wherein the flux has the system $CaO$—$Al_2O_3$—$CaF_2$.

* * * * *